Feb. 6, 1934.   R. KELLER   1,945,610
PROTECTIVE SYSTEM FOR SYNCHRONOUS MOTORS
Filed Dec. 11, 1928

Inventor
Robert Keller
By *Alfred H. Dyson*
Attorney

Patented Feb. 6, 1934

1,945,610

UNITED STATES PATENT OFFICE 1,945,610

PROTECTIVE SYSTEM FOR SYNCHRONOUS MOTORS

Robert Keller, Ennetbaden, Switzerland, assignor to Aktiengesellschaft Brown Boveri & Cie., Baden, Switzerland, a joint-stock company of Switzerland Application December 11, 1928, Serial No. 325,247, and in Germany December 19, 1927

6 Claims. (Cl. 175—294)

This invention relates to improvements in means for protecting synchronous motors in case of failure of the distribution line voltage and more particularly, to means for disconnecting such motors from such line.

When a synchronous motor is disconnected and reconnected to a supply line before the motor has stopped completely, the motor will be out of synchronism and will constitute a short circuit which will cause damage to the motor and to associated equipment. It is apparent that the short circuit will be greater, the greater the excitation of the motor. The above mentioned conditions will also be present during the time the motor is slowing down. It is, therefore, necessary that a synchronous motor be disconnected automatically when the speed thereof is reduced. Among the methods by which such disconnection has been effected heretofore was the use of zero voltage relays which was, however, inefficient because operation of such relays was prevented by the voltage generated by the motor itself when slowing down.

The present invention avoids the above difficulty by making tripping of the motor switch dependent on values other than merely the failure of voltage in the line to which the same is connected. One method by which such switch tripping may be accomplished is by taking advantage of the energy differences existing whether or not the motor is connected to the line.

It is, therefore, among the objects of the present invention to provide a system which will cause disconnection of a synchronous motor from the line when the voltage therein fails or drops below a certain value.

Another object of the invention is to utilize the energy differences existing when a synchronous motor is disconnected from a line for operating a motor switch which will prevent short circuiting of the motor when the same is reconnected.

Other objects will be apparent hereinafter from the description of the accompanying drawing in which.

Figure 1:
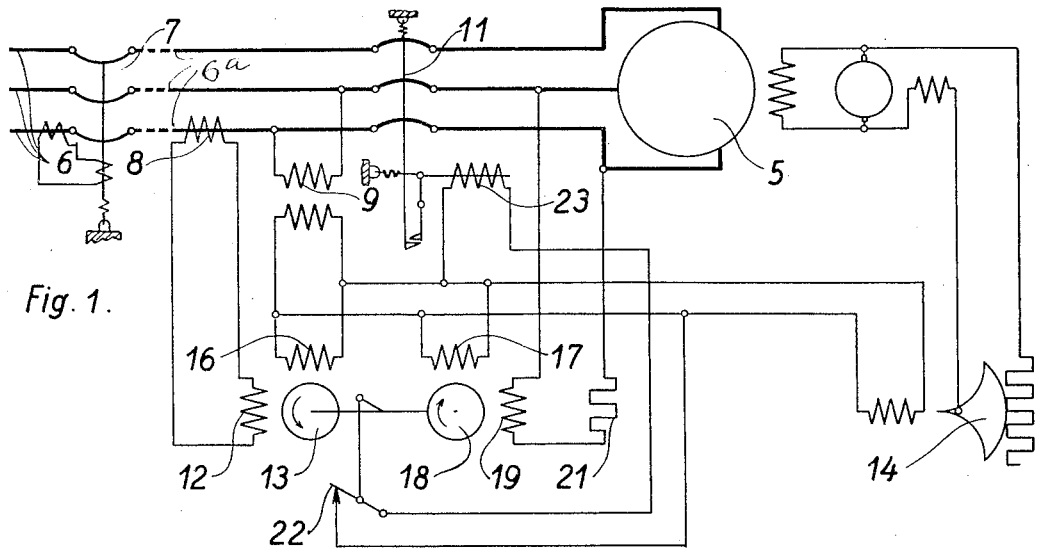
Figure 1 is a diagrammatic view of a system for protecting a synchronous motor against failure of the line voltage.

Referring more particularly to the drawing, 5 indicates a synchronous motor supplied from an electric distribution line 6 and 7 indicates an automatic switch for opening said line. The line 6 is connected to the motor by a line 6a which includes the primary coils of transformers 8 and 9 and a motor switch 11 between the motor 5 and the transformers 8 and 9.

The secondary coil of the transformer 8 is connected to a coil 12 forming a portion of a relay 13 of the watt meter type while the secondary coil of the transformer 9 is connected in parallel with a quick-acting voltage regulator 14. A coil 16, completing the coil arrangement of the relay 13 is connected across the secondary of the transformer 9, and a coil 17, forming a portion of the coil arrangement of a relay 18 of the watt meter type, is similarly connected. A coil 19, connected to the line 6a and a resistance 21, indicating equipment utilizing electrical energy, completes the coil arrangement of the relay 18. Relays 13 and 18 are connected by a common shaft which carries means for opening a contact 22 which forms a portion of the circuit for a no-voltage or holding coil 23 for retaining the motor switch 11 in closed position.

During normal operation, the torques of the relays 13 and 18 oppose each other, the relay circuits being so arranged that the torque of relay 13, which relay is influenced by the line current from transformer 8, is greater than the torque of relay 18, the latter relay being influenced by the current through the resistance 21, contact 22, therefore, remaining closed. In the event of failure of the line voltage in line 6a, as by the actuating of line switch 7 to open line 6, the switch 11 remains in closed position due to the action of the E. M. F., generated by the motor while it is slowing down, upon the coil of no-voltage relay 23. As soon as the motor 5 begins to slow down, the regulator 14 operates to maintain the voltage at a high value as long as may be possible. Said regulator 14, which changes the excitation resistance of the excitation machine of motor 5, is supplied by the voltage transformer 9. The position of the regulator changes, therefore, with the changing of its voltage at the transformer. If the line voltage fails, as by the opening of line switch 7 while switch 11 is still closed, motor 5 supplies voltage, as a generator, to transformer 9. The voltage of the motor would drop in proportion to its speed if the excitation machine maintained its field constant. The quick-acting regulator 14, however, endeavors to maintain a constant voltage, with decreasing speed, at the point 9 and, therefore, gradually disconnects more resistance from the excitation circuit until the regulator is in its end position.

Failure of the current in line 6a removes the force acting upon relay 13 and therefore relay 18, receiving energy from the motor acting as a generator, which energy is consumed by auxiliary equipment 21, is the only relay having any rotary force. The torque of the two relays being opposed, the common shaft of the relays is, therefore, rotated in a clockwise direction to open the contact 22 and thereby break the circuit to the coil 23 which immediately allows the switch 11 to open and disconnect the line 6a and motor 5 connected therewith from the line 6. It will be seen that the disconnecting of the motor by the automatically operating switch means comprising motor switch 11, in the event of failure of the line supply as by the opening of a line switch 7, protects the motor and associated equipment against danger of short-circuit in case the line supply is reestablished, as by the reclosing of said line switch 7, while the motor is slowing down.

Figure 2:
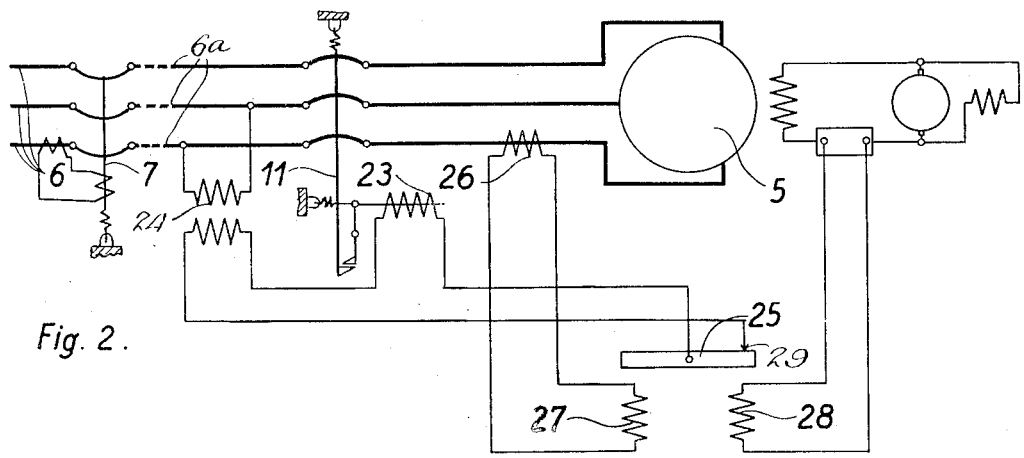
Fig. 2 is a diagrammatic view of a modified system embodying the present invention.

In the arrangement shown in Fig. 2, the line 6a, which is connected to 6 containing the switch 7, is connected to the synchronous motor 5 and the motor switch 11 is maintained in closed position by the zero voltage or holding coil 23. The primary coils of two transformers 24 and 26 are connected to the line 6a. Transformer 24 normally supplies voltage to the no-voltage coil 23 thereby preventing action of the relay on the latch of switch 11 and retaining the same in closed position. A differential relay, generally indicated at 25, includes the coils 27 and 28. During normal operation, the force acting on coil 27 is greater than that acting on coil 28, contacts 29, therefore, remaining closed. Relay 25 is arranged to operate on contacts 29 to open the circuit of coil 23 under conditions to be hereinafter set forth. Coil 27 receives current from the line 6a through a transformer 26 and coil 28 is supplied from the excitation circuit of the motor.

During normal operation of the motor, voltage taken from the line 6a by the transformer 24 retains the switch 11 in closed position by preventing action thereon of the coil 23. In case of failure of the line voltage, as by the opening of switch 7, the voltage in the line 6a drops, said line being under the influence of only the voltage produced by the motor 5 acting as a generator while slowing down. The secondary coil of the transformer 26 accordingly is not under the normal voltage and the coil 27 of the differential relay does not have the normal force acting thereon. The coil 28 of the differential relay is supplied with current taken from the exciter circuit of the motor 5 which tends to remain at a high value even when the motor is disconnected from the line, as explained hereinbefore in connection with Fig. 1. Accordingly, the force acting upon the coil 28 is greater than the force acting upon the coil 27, when the line 6a is without voltage, and the relay moves in clock-wise direction to open the contacts 29 whereby the circuit of the coil 23 is disconnected and the switch 11 is unlatched and allowed to disconnect motor 5 from line 6a.

Although only two embodiments of the invention have been illustrated and described, it will be apparent that various changes and modifications may be made therein without departing from the spirit thereof or from the scope of the appended claims.

I claim:

1. In a system for protecting synchronous motors connected to transmission lines, an A. C. line, a synchronous motor, an excitation circuit for said motor, a switch adjacent said motor, transformers having the primary coils thereof in operative relation with said line, a holding coil for said switch connected to the secondary coil of one of said transformers and normally energized therefrom for retaining said switch in connected position, a differential relay connected to said transformers for de-energizing said holding coil to permit disconnecting said switch, one portion of said differential relay being actuated in dependence on the conditions in said line and the other portion of said relay being influenced by the conditions in said said excitation circuit of said motor.

2. In an electric control system, in combination with a source of electric current supply, a motor arranged to be supplied with operating current from said source, a switch arranged to effect connection and disconnection of said motor with said source, the said switch comprising a holding coil connected to be energized in response to flow of current from said source to said motor to maintain the said source in connection with the said motor, of a relay comprising a pair of coils supplied from said source and connected between said source and said switch operative when energized therefrom to maintain the said holding coil energized, the said relay comprising also a pair of coils connected to be energized responsive to potential delivered thereto from said motor upon the occurrence of interruption of flow of current from said source to said motor to effect deenergization of said holding coil.

3. In an electric control system, the combination of a source of electric current supply, a motor arranged to be supplied with operating current from said source, a switch operative to effect connection of said source with and disconnection from the said motor, the said switch comprising a holding coil connected to be energized from said source and when so energized to maintain said source in connection with the said motor, and a relay operative to effect energization and deenergization of the said holding coil, the said relay comprising a watt-metric element connected with said source between said source and said switch and energized during flow of current from said source to said motor to maintain energization of said holding coil, the said relay having an element connected to be energized responsive to potential delivered thereto from said motor upon the occurrence of interruption of flow of current from said source to said motor to effect disconnection of said holding coil from said source.

4. In a control system, the combination of a source of electric current supply, a motor arranged to be supplied with operating current from said source, a switch disposed to effect connection and disconnection of said source with and from the said motor, said switch comprising a holding coil connected to be energized from said source and when so energized to maintain connection of said source with the said motor, and a relay operative to control connection and disconnection of said coil with said source, said relay comprising a watt-metric element connected with said source between the said source and said switch effective when energized therefrom to maintain said coil in connection with said source and thereby connection of said source with the said motor, the said relay having an element connected with said source and with said motor to produce a torque in opposition to the torque produced by said watt-metric element operative responsive to potential delivered thereto by said motor upon the occurrence of cessation of flow of current to said motor from said source to effect disconnection of said holding coil from said source.

5. In an electric control system, a source of electric current, a motor arranged to be supplied with operating current from said source, an excitation circuit for said motor, a switch operable to effect the connection of said motor with and disconnection from said source, said switch comprising a holding coil operable when energized to cause said switch to maintain said connection and operable when deenergized to permit actuation of said switch to effect said disconnection, a relay operable in one sense responsive to flow of current from said source to said motor to cause energization of said coil and operable in another sense upon the occurrence of interruption of flow of current from said source to said motor responsive to increased excitation of said motor to cause deenergization of said coil.

6. In an electric control system, a source of electric current, a motor arranged to be supplied with operating current from said source and having a field excitation winding, means actuated responsive to and in dependence upon variations in the magnitude of the potential of said source operable to vary the extent of excitation of said winding, a switch operable to effect connection of said motor with and disconnection thereof from said source, said switch comprising a holding coil operable when energized to cause said switch to maintain said connection and operable upon deenergization to permit actuation of said switch to effect said disconnection, a relay operable in one sense responsive to flow of current from said source to said motor to cause energization of said coil and operable in another sense upon the occurrence of interruption of flow of current from said source to said motor to cause deenergization of said coil, the operation of said relay in the said another sense being in dependence upon the extent of excitation of said field winding as determined by the extent of actuation of said means.

ROBERT KELLER.

CERTIFICATE OF CORRECTION.

Patent No. 1,945,610.  February 6, 1934.

ROBERT KELLER.

It is hereby certified that error appears in the printed specification of the above numbered patent requiring correction as follows: Page 2, line 84, claim 1, for "said" first occurrence read the; and that the said Letters Patent should be read with this correction therein that the same may conform to the record of the case in the Patent Office.

Signed and sealed this 13th day of March, A. D. 1934.

F. M. Hopkins (Seal) Acting Commissioner of Patents.